United States Patent
Luther et al.

(10) Patent No.: US 10,246,758 B2
(45) Date of Patent: Apr. 2, 2019

(54) METHOD FOR PRODUCING A COMPONENT FROM STEEL BY HOT FORMING

(71) Applicant: SALZGITTER FLACHSTAHL GMBH, Salzgitter (DE)

(72) Inventors: Friedrich Luther, Hannover (DE); Thomas Evertz, Peine (DE); Stefan Muetze, Hannover (DE); Michael Braun, Lehre (DE)

(73) Assignee: SALZGITTER FLACHSTAHL GMBH, Salzgitter (DE)

( * ) Notice: Subject to any disclaimer, the term of this patent is extended or adjusted under 35 U.S.C. 154(b) by 862 days.

(21) Appl. No.: 14/389,072

(22) PCT Filed: Feb. 27, 2013

(86) PCT No.: PCT/DE2013/000126
§ 371 (c)(1),
(2) Date: Sep. 29, 2014

(87) PCT Pub. No.: WO2013/143519
PCT Pub. Date: Oct. 3, 2013

(65) Prior Publication Data
US 2015/0047753 A1    Feb. 19, 2015

(30) Foreign Application Priority Data

Mar. 30, 2012   (DE) .................. 10 2012 006 941

(51) Int. Cl.
| | | |
|---|---|---|
| *C21D 9/46* | (2006.01) | |
| *C23C 2/06* | (2006.01) | |
| *C23F 17/00* | (2006.01) | |
| *C21D 1/26* | (2006.01) | |
| *C21D 1/42* | (2006.01) | |
| *C21D 9/48* | (2006.01) | |
| *C21D 1/673* | (2006.01) | |
| *C21D 8/02* | (2006.01) | |
| *C23C 2/12* | (2006.01) | |

(52) U.S. Cl.
CPC .............. *C21D 9/46* (2013.01); *C21D 1/26* (2013.01); *C21D 1/42* (2013.01); *C21D 1/673* (2013.01); *C21D 8/0226* (2013.01); *C21D 8/0236* (2013.01); *C21D 8/0263* (2013.01); *C21D 9/48* (2013.01); *C23C 2/06* (2013.01); *C23C 2/12* (2013.01); *C23F 17/00* (2013.01); *C21D 2211/001* (2013.01); *C21D 2211/008* (2013.01); *Y02P 10/253* (2015.11)

(58) Field of Classification Search
CPC ............................ C21D 9/46; C21D 8/0205
USPC ....................................................... 148/654
See application file for complete search history.

(56) References Cited

U.S. PATENT DOCUMENTS

| | | | | |
|---|---|---|---|---|
| 4,088,511 | A * | 5/1978 | Rowney ................... | C21D 8/00 148/566 |
| 4,720,307 | A * | 1/1988 | Matsumoto .............. | C21D 8/00 148/654 |
| 5,746,845 | A * | 5/1998 | Yoshida ................... | C21D 6/02 148/587 |
| 6,564,604 | B2* | 5/2003 | Kefferstein ............ | B21D 22/20 |
| 2009/0007999 | A1* | 1/2009 | Asai ....................... | B21D 22/26 148/654 |
| 2009/0277539 | A1* | 11/2009 | Kimura ................ | C21D 8/0205 148/504 |
| 2010/0000634 | A1 | 1/2010 | Spehr et al. | |
| 2010/0000636 | A1* | 1/2010 | Bonnefois ............ | C21D 8/0226 148/541 |
| 2012/0074733 | A1 | 3/2012 | Lenze et al. | |
| 2012/0097298 | A1* | 4/2012 | Sommer ................ | C21D 1/673 148/640 |
| 2012/0107632 | A1 | 5/2012 | Braun et al. | |
| 2012/0125068 | A1 | 5/2012 | Kümmerling et al. | |
| 2013/0048150 | A1 | 2/2013 | John et al. | |
| 2013/0240520 | A1 | 9/2013 | Braun et al. | |
| 2013/0333433 | A1 | 12/2013 | Kümmerling et al. | |

FOREIGN PATENT DOCUMENTS

| | | |
|---|---|---|
| DE | 60119 826 | 12/2006 |
| DE | 699 33 751 | 10/2007 |
| DE | 102009016027 | 10/2010 |

(Continued)

OTHER PUBLICATIONS

International Search Report issued by the European Patent Office in International Application PCT/DE2013/000126.

(Continued)

*Primary Examiner* — Colleen P Dunn
*Assistant Examiner* — Jeremy C Jones
(74) *Attorney, Agent, or Firm* — Henry M. Feiereisen LLC

(57) ABSTRACT

The invention relates to a method for producing a component from transformable steel by hot forming, in which a plate first is cut out of a strip or sheet as the pre-material, and is then heated to forming temperature and pre-formed, having an at least partially martensitic transformation structure after forming. Instead of a press mold hardening, the at least partially martensitic transformation structure is created in the pre-material, or in the plate to be formed, by austenitization and quenching already before forming, and then the thus-conditioned plate is reheated after forming, while maintaining the at least partially martensitic transformation structure, to a temperature below the Ac1 transformation temperature, and formed at this temperature.

18 Claims, No Drawings

(56) References Cited

FOREIGN PATENT DOCUMENTS

DE    102009025821    12/2010
EP      1 783 234     9/2002
WO    WO2013/010524   1/2013

OTHER PUBLICATIONS

ThyssenKrupp Stahl: Umformverhalten höher- und höchstfester Mehrphasenstähle Aug. 31, 1999, pp. 1-36, XP002699588.
ArcelorMittal: "Dual- und Komplexphasenstähle" Nov. 19, 2012 pp. 1-9, XP002699591.

* cited by examiner

METHOD FOR PRODUCING A COMPONENT FROM STEEL BY HOT FORMING

CROSS-REFERENCES TO RELATED APPLICATIONS

This application is the U.S. National Stage of International Application No. PCT/DE2013/000126, filed Feb. 27, 2013, which designated the United States and has been published as International Publication No. WO 2013/143519 and which claims the priority of German Patent Application, Serial No. 10 2012 006 941.3, filed Mar. 30, 2012, pursuant to 35 U.S.C. 119(a)-(d).

BACKGROUND OF THE INVENTION

The invention relates to a method for the production of a component from steel by hot forming.

Such components are predominantly used in the automotive industry, but their use is also possible in mechanical engineering or civil engineering.

The hotly contested market forces automobile manufacturers to constantly seek solutions to reduce their fleet consumption while maintaining a highest possible comfort and occupant protection. Weight savings of all vehicle components play hereby a crucial role on one hand; on the other hand, a high passive occupant protection should be achieved which requires correspondingly high strengths statically/dynamically. In the event of a crash, it is also strived at a reduction of crash energy, this requires a ductile failure behavior.

Suppliers of source material attempt to take this necessity into account by reducing the wall thicknesses through use of high-strength or ultra high-strength steels, while improving component behavior during manufacture and during operation at the same time.

These steels must therefore satisfy comparatively high requirements in terms of strength, ductility, toughness, energy absorption, and corrosion resistance as well as handling capability, for example during cold forming and joining.

Against the background of the afore-mentioned aspects, the production of components of hot-malleable steels gains increasingly in importance because these components ideally meet the increased demands in terms of component properties while still requiring less material.

The production of components by quenching preliminary products of press hardenable steels by hot forming in a forming tool is known from DE 601 19 826 T2. A sheet metal blank, which has been heated beforehand to above the austenitizing temperature of 800-1200° C. and optionally provided with a metallic coating of zinc or zinc-based, is transformed here sometimes in a cooled tool through hot forming into a component, whereby the metal sheet or component undergoes in the forming tool during forming a hardening by quenching (press hardening) as a result of a rapid heat extraction and reaches the required strength properties due to the realized martensitic hardness microstructure.

The production of components by hot forming in a forming tool of quenched preliminary products of press hardenable steels and coated with an aluminum alloy is known from DE 699 33 751 T2. A sheet metal blank coated with an aluminum alloy is heated here before forming to above 700° C., with an intermetallically alloyed compound on the basis of iron, aluminum and silicon being realized on the surface, and the metal sheet is then formed and cooled down at a rate above the critical quenching rate.

The metallic coating is normally applied during the continuous hot-dip process on a hot or cold strip, e.g. by hot dip galvanizing or hot dip aluminizing at temperatures of about 460° C. (hot dip galvanizing) and about 680° C. (hot dip aluminizing).

Application of a metallic coating onto the workpiece (strip, blank) to be formed before hot forming is of advantage because the presence of the coating effectively prevents scaling of the base material.

Subsequently, the blank is cut to size for hot forming in the forming tool.

Known hot-formable steels for this application are e.g. the manganese-boron steel "22MnB5".

The production of a component by press form hardening using known methods has several drawbacks.

In this method, the blank is heated to high temperatures above $Ac_3$ so as to realize a complete austenitizing of the material and cooled after the pressing rapidly enough so as to establish a martensitic structure.

On the one hand, this method requires very much energy as a result of heating the preliminary product to austenitizing temperature and the transformation of ferrite to austenite, rendering the method expensive and producing significant amounts of $CO_2$ and thus counteracting the demand for more energy-efficient methods.

When using sheet metal with a protective layer against scaling, extremely high demands are faced in terms of the temperature stability of the coating system, since the transformation at temperatures above the $Ac_3$ temperature is generally significantly above 800° C. This has the consequence that the available process window is considerably smaller during press hardening compared to the use of material without a protection against scaling. For example, certain furnace times may not be exceeded. Furthermore, when the use of zinc-based coatings is involved, there is the risk of liquid metal embrittlement in these temperature ranges. Moreover, the high operating temperatures cause intense alloying of the metallic layer with iron, thus decreasing the corrosion protection effect in the finished component.

In addition to the described drawbacks, it should be noted that the known method is energy-intensive, resulting in high component prices and is $CO_2$-intensive, causing excessive harm to the environment.

EP 1 783.234 A1 discloses a method for the production of products by forming at elevated temperatures, wherein a galvanized steel sheet is heated to a forming temperature of 450° C. to 700° C., then formed and slowly cooled down uncontrolled. In this way, the presence of excess stress should be avoided during hot forming. In general, it is stated that an improvement of the mechanical properties should be achieved in comparison to the cold forming.

SUMMARY OF THE INVENTION

Object of the invention is to provide a method for the production of a component by hot forming, which is inexpensive and which attains comparable or improved properties of the formed component like in the known hot forming by press hardening.

According to the teaching of the invention, this object is achieved by a method for the production of a component from malleable steel by hot forming, whereby a blank is initially cut to size from a strip or metal sheet as a source material, then is heated to forming temperature and formed, comprising an at least partly martensitic transformation microstructure after shaping, which method is characterized in that, instead of undergoing press form hardening, the at least partly martensitic transformation microstructure is produced in the source material by austenitizing and quenching already prior to shaping or produced in the blank to be formed, and then, while maintaining the at least partly martensitic transformation microstructure, the thus-conditioned blank is heated again after undergoing the forming process to a forming temperature below the $Ac_1$ point and formed at this temperature.

Compared to press form hardening known from the DE 601 19 826 T2 for the production of a component, the method according to the invention has the advantage that decoupling the forming process from the microstructure transformation through quench-hardening, a much lower energy demand is needed for heating the blank. The energy consumption for the preceding microstructure transformation cannot be compared therewith, when the partly martensitic microstructure transformation is integrated in one of the necessary processes at the steel manufacturer's end.

Another major advantage resides in the possibility to utilize already existing facilities for press form hardening which when used for the method described herein can however be operated at significantly reduced power output.

The component properties are thus determined to a large extent by the conditioning before forming and can be adjusted within a wide range by the respective alloy composition and the heat treatment of the source material.

The conditioning of the source material or the trimmed blank for realizing an at least partly martensitic microstructure may be implemented selectively discontinuously or continuously, with hot or cold rolled steel strip being used according to need.

A further advantage over the known press form hardening is the significant decrease in scaling of metal sheets without having protection against scaling, since heating is carried out at significantly lower temperatures ($<Ac_1$) compared to press form hardening ($>Ac_3$). Thus, costs for refinishing of scaled component surfaces are reduced and service life of the tools is increased, leading to cost savings when using the method according to the invention.

In addition, a further advantage over the known press form hardening resides in the ability to apply as corrosion and scale protection a conventional zinc coating using hot dipping which would not survive the known press hardening process due to the low thermal resistance. Further, the iron content of the coating on the finished component is less than in components with metallic coatings which have been produced by the known press form hardening. As a result, a significantly improved corrosion protection is realized.

According to an advantageous configuration of the invention, the conditioning is already carried out continuously on the steel strip during run-through annealing which may, if need be, combined advantageously with a hot dip coating so that the conditioned strip has already a metallic coating for further processing.

Optionally, it is also possible to apply the metal coating upon the pre-trimmed blank or the finished component. It is, however, more advantageous to apply the metallic coating in a continuous process upon a hot or cold rolled steel strip.

According to an advantageous refinement of the invention, quench hardening of the source material or the blank is followed by a quenching and tempering step through tempering at temperatures of 180° C. to 680° C., or advantageously between 250° C. and 500° C., and a subsequent hot dip coating, ideally at temperatures between 250° C. and the melt bath temperature, so that the finished source material/ the finished blank has a quenched and tempered state that offers ideal conditions for the subsequent forming at temperatures $<Ac_1$.

The tempering process may be implemented on the source material or on the blank. In the event, the source material, e.g. the steel strip, should undergo run-through annealing and then hot dip coating, it can be appropriate to execute the method steps of austenitizing, quenching below the martensite starting temperature, reheating and tempering to melt bath temperature and hot dip coating in a continuous hot dip coating facility. Furthermore, it may be appropriate to execute reheating of the at least partly martensitic strip by inductive heating immediately before the zinc bath.

The invention is generally applicable for components of high-strength or ultra high-strength steels, e.g. with yield strengths of 280 MPa to 1200 MPa or even higher depending on the selected alloy concept. Higher strength steels involve all single phase but also multiphase steel grades. These include micro-alloyed higher strength steel grades as well as bainitic or martensitic grades and dual or multi-phase steels.

As a result of the comparably small amount of heat, the need for large reheating units, such as e.g. tunnel furnaces or batch furnaces, can be eliminated in favor of fast and directly acting systems (inductive, conductive and especially irradiation).

In addition, the described novel method requires considerably less heat energy and the energy efficiency is higher than in press hardening. As a result, process costs are lower and $CO_2$ emission is reduced.

Preferably, reheating is carried out before the warm forming by means of irradiation, since the efficiency is considerably higher than heating in a furnace or conductive heating, and the energy input into the material is faster and more effective depending on the surface finish.

The use of radiators also allows heating of desired individual portions of the workpiece to be formed so as to obtain load-optimized components.

It may be useful for the transport between heat source and forming tool, especially when very thin metal sheets (e.g. <0.8 mm) are involved, to provide a profiling of the blanks in order to increase the local stiffness. This is not possible with conventional press hardening because the attainable strength requires a sudden cooling that is precluded by the openings in the tool due to the profiling.

In the method according to the invention, the blank is heated to a temperature below $Ac_1$, advantageously below 700° C., more advantageously in a temperature range of 400-700° C., and then formed into a component. The optimum forming temperature is dependent on the required strength of the component, and is preferably between about 460° C. and 700° C.

It is also advantageous in this method that offsets are introduced into the component by the forming according to the invention at temperatures $<Ac_1$, via which a further increase in strength can be established as the temperature for a complete removal of the offsets in terms of recrystallization or recovery at industrially used cycle times of maximal 15 s per component or significantly below that is insufficient.

In combination with the hindrance of offsets by interstitially dissolved elements (e.g. C, B, N), a further increase in strength by the so-called "bake-hardening effect" or by an additional precipitation formation, e.g. VC, is rendered possible during the pressing process and the subsequent cooling. As an alternative, the increase in strength may also be realized by a controlled cooling or a subsequent heat treatment (e.g. paint baking or stress relieve heat treatment).

According to an advantageous configuration of the invention, the temperature range of the warm forming is locally exceeded in the austenitizing range during heating of the preliminary product to forming temperature so as to realize desired local property changes (e.g. local hardening), which in combination with the increase in strength of the remaining material is suited to the subsequent stress of the component.

The essential advantages of the invention can be summarized as follows:

Low energy consumption at the processor's end.

Already existing industrial heating and forming units can be used.

The component properties can be influenced within wide limits by a preconditioning at the steel manufacturer's end.

Standard zinc coatings can be used as corrosion and scale protection, which would not withstand a conventional press hardening process due to the low thermal stability.

The iron content of the coating on the finished component is less than in the case of components with metallic coatings which have been produced by the known press form hardening. This results in a significantly improved corrosion protection.

When using galvanized metal sheets, there is no risk of liquid metal embrittlement because of the smaller forming temperatures.

When using ungalvanized metal sheets the scaling is significantly lower than in the known press hardening process, so that costs to refinish scaled component surfaces are reduced and the service life of the tools is increased.

The strength can be further increased by "bake-hardening" during the warm process.

BRIEF DESCRIPTION OF THE DRAWING

None

DETAILED DESCRIPTION OF PREFERRED EMBODIMENTS

None

The invention claimed is:

1. A method for the production of a component from transformable steel, comprising the steps in the order of:
cutting to size a blank as source material from a strip or metal sheet;
austenitizing and quenching the blank such as to produce a partly martensitic transformation microstructure and a residual austenite microstructure, by heating the blank to an austenitizing temperature within a continuous annealing process and subsequently quenching the blank;
applying a coating on the blank by a hot dip process after the annealing process;
reheating the blank to a forming temperature below the $Ac_1$ transformation temperature, while maintaining the partly martensitic transformation microstructure and the residual austenite microstructure; and
forming the blank at the forming temperature below the $Ac_1$ transformation temperature into the component while still maintaining the partly martensitic transformation microstructure and the residual austenite microstructure in the component.

2. The method of claim 1, further comprising tempering the blank after undergoing quenching.

3. The method of claim 2, wherein the blank is tempered at a temperature range of 250° C. to 680° C.

4. The method of claim 3, wherein the blank is tempered at a temperature range of 430° C. to 490° C.

5. The method of claim 1, further comprising tempering the blank prior to applying the coating.

6. The method of claim 5, wherein the blank is tempered at a temperature range of 250° C. to 680° C.

7. The method of claim 6, wherein the blank is tempered at a temperature range of 430° C. to 490° C.

8. The method of claim 5, wherein the blank is tempered at a tempering temperature which corresponds to a melt bath temperature.

9. The method of claim 1, further comprising tempering the blank after applying the coating.

10. The method of claim 9, wherein the blank is tempered at a temperature range of 250° C. to 680° C.

11. The method of claim 10, wherein the blank is tempered at a temperature range of 430° C. to 490° C.

12. The method of claim 9, wherein the blank is tempered at a tempering temperature which corresponds to a melt bath temperature.

13. The method of claim 1, wherein the blank is formed at a temperature below 700° C.

14. The method of claim 1, wherein the blank is formed at a temperature range between 400° C. and 700° C.

15. The method of claim 1, wherein the blank is formed at a temperature range between 460° C. and 700° C.

16. The method of claim 1, wherein the metallic coating is made of at least one element selected from the group consisting of Zn, Mg, Al, and Si, and an alloy system of the afore-mentioned elements.

17. The method of claim 1, wherein the blank is heated inductively, conductively or by irradiation.

18. The method of claim 1, wherein that the blank is a hot or cold rolled steel strip.

* * * * *